(12) United States Patent
Ra

(10) Patent No.: US 9,200,444 B2
(45) Date of Patent: Dec. 1, 2015

(54) VARIABLE FASTENER FOR FIXING A CURTAIN WALL

(76) Inventor: Tae Yong Ra, Seoul (KR)

(*) Notice: Subject to any disclaimer, the term of this patent is extended or adjusted under 35 U.S.C. 154(b) by 0 days.

(21) Appl. No.: 13/696,106

(22) PCT Filed: Apr. 22, 2011

(86) PCT No.: PCT/KR2011/002945
§ 371 (c)(1),
(2), (4) Date: Nov. 5, 2012

(87) PCT Pub. No.: WO2011/139038
PCT Pub. Date: Nov. 10, 2011

(65) Prior Publication Data
US 2013/0051903 A1    Feb. 28, 2013

(30) Foreign Application Priority Data
May 4, 2010    (KR) .................. 10-2010-0041922

(51) Int. Cl.
E04B 2/88    (2006.01)
E04B 2/96    (2006.01)
E04B 2/90    (2006.01)

(52) U.S. Cl.
CPC ... *E04B 2/90* (2013.01); *E04B 2/96* (2013.01); *Y10T 403/42* (2015.01)

(58) Field of Classification Search
CPC ............... E04B 2/88; E04B 2/90; E04B 2/96; Y10T 403/42
USPC ......................................................... 52/235
See application file for complete search history.

(56) References Cited

U.S. PATENT DOCUMENTS 3,715,850 A * 2/1973 Chambers ...................... 52/701
4,073,107 A * 2/1978 Rousseau ........................ 52/235

(Continued)

FOREIGN PATENT DOCUMENTS

JP    5-14330 U    2/1993
JP    05051987 A *  3/1993

(Continued)

OTHER PUBLICATIONS

Machine translation of JP 05051987 A prepared by EPO on May 13, 2015 (10 pages).*

(Continued)

*Primary Examiner* — Rodney Mintz
(74) *Attorney, Agent, or Firm* — Revolution IP, PLLC

(57) ABSTRACT

The present invention relates to a variable fastener for fixing a curtain wall, enabling a vertical member of a curtain wall unit to be coupled to an end portion of a building slab (S), wherein the variable fastener comprises: a first bracket fixed to the end portion of the slab (S); and a second bracket, one side of which is coupled to the vertical member of the curtain wall unit, and the other side of which is coupled to the first bracket, so as to transfer the load of the curtain wall unit to the slab (S). The first bracket includes a planar base portion fixed to the end portion of the slab (S), and a support portion formed on the front end of the base portion so as to be higher than the upper surface of the base portion. The second bracket includes: a planar fixing portion fixed to the vertical member of the curtain wall unit; a height-adjusting bolt coupled and fixed perpendicularly at one side end of the fixing portion that is in the direction of the first bracket; a catching portion, one side of which is coupled so as to be horizontally pivotable and vertically slidable on the height-adjusting bolt, and the other side of which is mounted on an upper part of the support portion; and a height-adjusting nut fastened to the height-adjusting bolt, for adjusting the height of the catching portion.

2 Claims, 12 Drawing Sheets

(56) References Cited

U.S. PATENT DOCUMENTS

| | | | |
|---|---|---|---|
| 4,522,003 A * | 6/1985 | Akihama et al. | 52/391 |
| 4,546,582 A * | 10/1985 | Gartner | 52/235 |
| 4,561,228 A * | 12/1985 | Kaminaga | 52/235 |
| 4,565,040 A * | 1/1986 | Kaminaga | 52/235 |
| 4,570,401 A * | 2/1986 | Uebel et al. | 52/235 |
| 4,744,191 A * | 5/1988 | Fricker | 52/702 |
| 4,782,635 A * | 11/1988 | Hegle | 52/126.4 |
| 4,831,805 A * | 5/1989 | Noborisaka et al. | 52/509 |
| 4,905,444 A * | 3/1990 | Semaan et al. | 52/710 |
| 5,035,099 A * | 7/1991 | Lapish | 52/713 |
| 5,063,718 A * | 11/1991 | Nonis | 52/235 |
| 5,067,292 A * | 11/1991 | Finean | 52/235 |
| 5,118,060 A * | 6/1992 | Spronken | 248/218.4 |
| 5,158,392 A * | 10/1992 | Takeda | 52/235 |
| 5,323,577 A * | 6/1994 | Whitmyer | 52/235 |
| 5,439,330 A * | 8/1995 | Bayer et al. | 408/1 R |
| 5,452,976 A * | 9/1995 | Bayer et al. | 411/55 |
| 5,502,936 A * | 4/1996 | Bayer et al. | 52/235 |
| 5,644,885 A * | 7/1997 | Eischeid | 52/513 |
| 6,056,037 A * | 5/2000 | Jonkman et al. | 160/207 |
| 6,499,261 B2 * | 12/2002 | Hikai | 52/235 |
| 6,594,962 B2 * | 7/2003 | Pardue | 52/235 |
| 6,598,362 B2 * | 7/2003 | Hikai | 52/235 |
| 6,658,804 B2 * | 12/2003 | Leytes et al. | 52/235 |
| 6,729,080 B1 * | 5/2004 | Zambelli et al. | 52/167.1 |
| 7,162,842 B2 * | 1/2007 | Ribic | 52/235 |
| 7,168,213 B2 * | 1/2007 | Rudduck et al. | 52/235 |
| 8,511,032 B2 * | 8/2013 | Abdel-Rahman et al. | 52/655.1 |
| 8,555,577 B2 * | 10/2013 | Maday et al. | 52/235 |
| 8,601,762 B2 * | 12/2013 | Walker, III | 52/235 |
| 8,613,173 B2 * | 12/2013 | Ander et al. | 52/235 |
| 8,615,938 B2 * | 12/2013 | Arbour | 52/173.3 |
| 8,646,229 B2 * | 2/2014 | Grunewald et al. | 52/235 |
| 8,955,285 B2 * | 2/2015 | Fournier et al. | 52/707 |
| 9,068,347 B2 * | 6/2015 | Moeller et al. | 52/235 |
| 2002/0095889 A1 * | 7/2002 | Hikai | 52/235 |
| 2005/0127256 A1 * | 6/2005 | Johnson et al. | 248/205.1 |
| 2005/0284053 A1 * | 12/2005 | Grunewald et al. | 52/235 |
| 2007/0022682 A1 * | 2/2007 | Morgenegg et al. | 52/235 |
| 2007/0039258 A1 * | 2/2007 | Walker, III | 52/235 |
| 2007/0094955 A1 * | 5/2007 | Safford | 52/204.5 |
| 2008/0222981 A1 * | 9/2008 | De Gobbi | 52/235 |
| 2009/0255206 A1 * | 10/2009 | Walker, III | 52/699 |
| 2010/0257812 A1 * | 10/2010 | Schultz et al. | 52/704 |
| 2011/0047881 A1 * | 3/2011 | Bjorn et al. | 49/399 |
| 2011/0146181 A1 * | 6/2011 | Traulsen et al. | 52/474 |
| 2011/0258945 A1 * | 10/2011 | Arbour | 52/173.3 |
| 2012/0055102 A1 * | 3/2012 | Fradera Pellicer | 52/167.1 |
| 2013/0139466 A1 * | 6/2013 | Abdel-Rahman et al. | 52/655.1 |
| 2014/0157699 A1 * | 6/2014 | Moeller et al. | 52/235 |
| 2014/0157718 A1 * | 6/2014 | Fournier et al. | 52/707 |
| 2015/0176288 A1 * | 6/2015 | Moeller et al. | 52/235 |

FOREIGN PATENT DOCUMENTS

| | | |
|---|---|---|
| JP | 06-059508 | 8/1994 |
| JP | 06-074711 | 10/1994 |
| JP | 9-209485 A | 8/1997 |
| KR | 10-2008-0103767 | 11/2008 |
| KR | 10-2009-0088106 | 8/2009 |
| WO | WO 2011139038 A3 * | 3/2012 |

OTHER PUBLICATIONS

International Search Report for PCT/KR2011/002945 mailed Jan. 4, 2012.

* cited by examiner

VARIABLE FASTENER FOR FIXING A CURTAIN WALL

RELATED APPLICATIONS

This application is a 371 application of International Application No. PCT/KR2011/002945, filed Apr. 22, 2011, which in turn claims priority from Korean Patent Application No. 10-2010-0041922, filed May 4, 2010, each of which is incorporated herein by reference in its entirety.

The present invention relates to a variable fastener for fixing a curtain wall, enabling a vertical member 10 of a curtain wall unit to be coupled to an end portion of a building slab (S), more particularly, to a variable fastener, a position of which may be adjusted in a forward, rearward and lateral direction and in an up-and-down direction, and a left-and-right rotation and an up-and-down rotation of which is possible.

A detailed embodiment of a structure, which fixes a curtain wall unit to a building structure to support the curtain wall unit, is shown in FIGS. 13 and 14, a scheme of transferring a load acting on the curtain wall unit to a slab (S) through a third fastener 5, a second fastener 4, a first fastener 3 and C-channel 2 to support the curtain wall unit is shown in FIG. 13, and a scheme of transferring a load acting on the curtain wall unit to the slab (S) through the second fastener 4, the first fastener 3 and the C-channel 2 to support the curtain wall unit is shown in FIG. 14.

Among those related arts, the scheme shown in FIG. 13 buries the C-channel 2 in the edge of the slab (S) to anchor the C-channel 2 to the slab (S), adjusts a position of the first fastener 3, in a front, rear, left and right direction in the C-channel 2 to anchor the first fastener 3 to the C-channel by assembling an anchor bolt 3b, a front-and-rear anchoring long hole 3a being formed in the first fastener 3, couples the third fastener 5, which is configured with a level bolt 5a assembled with a vertical member in a factory, to a groove 4a of the second fastener 4 in a site in a sliding manner, puts the second fastener 4 coupling to the third fastener 5 on the first fastener 3 to fix the second fastener 4, and finally, rotates a nut of the level bolt 5a to adjust an up-and-down position to keep the third fastener 5 unmoved to fix it.

In a construction process according to the above-described scheme, to compensate for an error generated by a construction and transformation of a building structure, the curtain wall unit is arranged by adjusting a position of the curtain wall unit in a front, rear, left and right direction and an up-and-down-direction. Here, an adjustment of a position in a left-and-right direction is conducted by moving the anchor bolt 3b inserted into the groove 2a of the C-channel 2 and the first fastener 3 in a left-and-right direction along the groove 2a. An adjustment of a position in a front-and-rear direction is conducted by moving the first fastener 3 in a front-and-rear direction about the anchor bolt 3b, which is inserted into the groove 2a formed in a C-channel 2 and inserted into the front-and-rear anchoring long hole 3a of the first fastener 3. Also, an adjustment of a position in an up-and-down direction is conducted by rotating the nut of the level bolt 5a formed in the third fastener 5.

The above-described related art scheme (FIG. 13) of supporting the curtain wall has the following limitations.

First, it is possible to adjust a position of the curtain wall unit in a front, rear, left and right direction and up-and-down direction, but it is impossible to rotate the curtain wall unit in a left-and-right and up-and-down direction, and thus, when a plane or a cross section is a curve, a separate fastener system has to be designed and manufactured depending on the curve.

Second, the level bolt 5a has only a function of transferring a dead load and adjusting a position in an up-and-down direction, and thus, an aluminum fastener 4 including a separate sliding groove 4a is needed so as to transferring a wind load. That is, because a function of transferring a dead load, adjusting a position in an up-and-down direction, and transferring a wind load between the fasteners is separated, it is uneconomical.

Third, it is difficult to manufacture the sliding groove 4a for transferring a wind load and a connection mean 5b inserted into the sliding groove 4a, with a steel material, and thus, the sliding groove 4a and the connection mean 5b has to be manufactured with an aluminum material which is free in a press. Therefore, a cost of manufacturing the fastener increases.

Among those related arts, the scheme shown in FIG. 14 buries the C-channel 2 in the edge of the slab (S) to anchor the C-channel 2 to the slab (S), adjusts a position of the first fastener 3, in a front, rear, left and right direction in the C-channel 2 to anchor the first fastener 3 to the C-channel by assembling an anchor bolt 3b, couples the second fastener 4, which is shop-assembled with a vertical member 1 of a curtain wall unit, to the first fastener 3, and finally, adjusts a position of the vertical long hole 3c in an up-and-down direction to weld the second fastener 4 so as not to move.

In a construction process according to the above-described scheme, to compensate for an error generated by a construction and transformation of a building structure, the curtain wall unit is arranged by adjusting the curtain wall unit in a front, rear, left and right direction and an up-and-down-direction. Here, an adjustment of a position in a left-and-right direction is conducted by moving the anchor bolt 3b inserted into the groove 2a of the C-channel 2 and the first fastener 3, in a left-and-right direction along the groove 2a. An adjustment of a position in a front-and-rear direction is conducted by moving the first fastener 3 in a front-and-rear direction about the anchor bolt 3b, which is inserted into the groove 2a formed in a C-channel 2 and inserted into the front-and-rear anchoring long hole 3a of the first fastener 3. Also, an adjustment of a position in an up-and-down direction is conducted by moving a connection bolt of the first fastener 3 and the second fastener 4 inserted into a vertical long hole 3c formed in the first fastener 3, in a up-and-down direction.

The above-described related art scheme (FIG. 14) of supporting the curtain wall has the following limitations.

First, it is possible to adjust a position of the curtain wall unit in a front, rear, left and right direction, but it is impossible to rotate the curtain wall unit in a left-and-right direction and an up-and-down direction, and thus, when a plane or a cross section is a curve, a separate fastener system has to be designed and manufactured depending on the curve.

Second, because the vertical long hole 3c is formed in a vertical wing of the first fastener 3, a height of a position, in which the connection bolt of the first fastener 3 and the second fastener 4 is coupled, from the plane of the slab is very high. Therefore, because a deviation between a connection portion and a bottom portion with respect to a wind load, namely, a bending moment is increased, and thus, a size or width of the first fastener is increased, and also, a size or width of the anchor bolt 3b and C-channel 2 is increased, it is uneconomical.

Third, an adjustment of a position in an up-and-down direction about the bolt of the vertical long hole 3c is conducted when a curtain wall unit is being hung, and the bolt is fastened and welded to be fixed, and thus, a construction is difficult, risk of fire by the welding is increased, and quality is decreased.

Fourth, because the vertical long hole 3c is formed, a height of the wing of the first fastener becomes higher, and thus, it is impossible to be applied in a site with a low floor.

Accordingly, the present invention is directed to provide a variable fastener for fixing a curtain wall which substantially obviate one or more problems due to limitations and disadvantages of the related art.

A first aspect of the present invention is directed to provide a new concept fastener, which enables a left-and-right rotation and an up-and-down rotation as well as an adjustment of a position in a front, rear, left and right direction to be performed individually or simultaneously, thereby being widely used in a curtain wall unit of a variety of curve forms.

A second aspect of the present invention is directed to provide a variable fastener, which enables an easy adjustment of a position in an up-and-down direction to be performed and enables a portion performing the function to be structurally used for a dead load and a wind load, namely, enables a junction part to simultaneously perform two functions (an adjustment of a position in an up-and-down direction, and a transmission of a dead load and a wind load), and thus, increases an economic feasibility.

A third aspect of the present invention is directed to provide a variable fastener, which is formed of a steel material to perform the above-described function and effect without a sliding groove (a reference numeral '4a' in FIG. 13), and thus, saves the manufacturing cost.

A fourth aspect of the present invention is directed to provide a new concept fastener, which minimizes a deviation between connection portions in a stream of the wind load transferred from the curtain wall to the slab, and thus, achieves the highest structural result by using the minimal members, namely, simultaneously achieves a safety and weight-lightening of members, and thus, improves workability and saves the material cost.

A fifth aspect of the present invention is directed to provide a new concept fastener, which achieves a scheme of coupling a second fastener to a curtain wall unit or a vertical member in a factory in advance, simply placing the second fastener to the first fastener, adjusting a position in a front-and-rear direction and a up-and-down direction, and thus, strongly fixing the curtain wall unit to the slab by simply assembling a bolt instead of the welding, thereby simplifying a site process and improving quality.

A sixth aspect of the present invention is directed to provide a new concept fastener, which lowers a height of the members composing the fastener, and thus, is easily used in a site with a low floor or in a site without a fan coil box.

To achieve these and other advantage and in accordance with the purpose of the invention, as embodied and broadly described herein, there is provided a variable fastener for fixing a curtain wall, enabling a vertical member 10 of a curtain wall unit to be coupled to an end portion of a building slab (S), the variable fastener comprising: a first bracket 100 fixed to the end portion of the slab (S); and a second bracket 200, one side of which is coupled to the vertical member 10 of the curtain wall unit, and the other side of which is coupled to the first bracket 100, so as to transfer the load of the curtain wall unit to the slab (S), wherein the first bracket 100 includes a base portion 110 fixed to the end portion of the slab (S), and a support portion 120 formed on the front end of the base portion so as to be higher than the upper surface of the base portion 110, and the second bracket 200 includes a fixing portion 210 fixed to the vertical member 10 of the curtain wall unit, a height-adjusting bolt 220 coupled and fixed perpendicularly at one side end of the fixing portion 210, the one side end being in the direction of the first bracket 100, a catching portion 230, one side of which is coupled so as to be horizontally rotatable and vertically slidable on the height-adjusting bolt, and the other side of which is mounted on an upper part of the support portion 120, and a height-adjusting nut 240 fastened to the height-adjusting bolt to adjust the height of the catching portion 230.

Moreover, the second bracket 200 may include a planar fixing portion 210 fixed to the vertical member 10 of the curtain wall unit, a height-adjusting bolt 220 coupled perpendicularly along one side end of the fixing portion 210, the one side end being in the direction of the first bracket 100, and horizontally rotatable, a catching portion 230, one side of which is coupled to the height-adjusting bolt 220, and the other side of which is mounted on an upper part of the support portion 120, and a height-adjusting nut 240 fastened to the height-adjusting bolt 220 to be fixed and integrally rotated with the height-adjusting bolt 220 to adjust the height of the catching portion 230.

Figure 10:
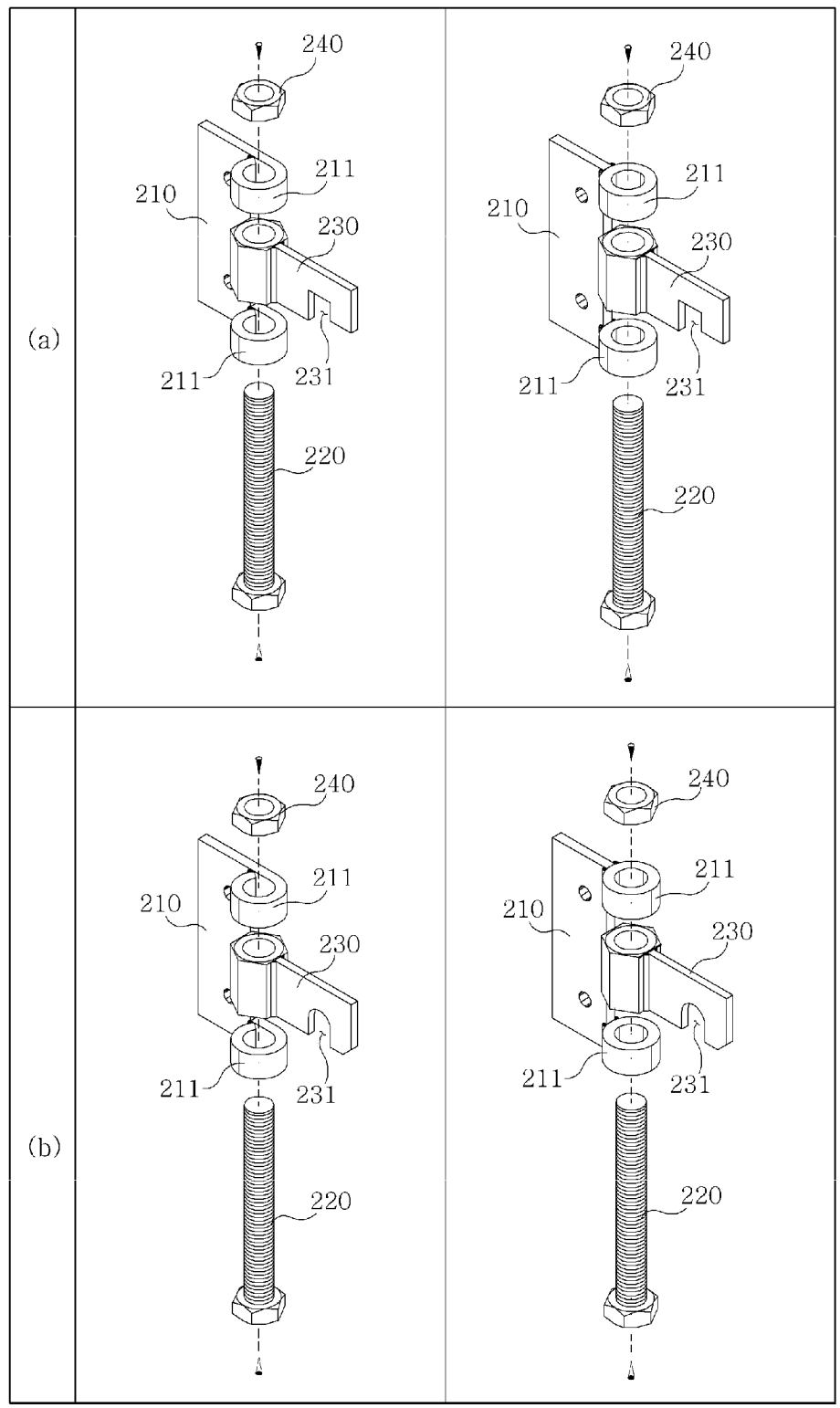
Figure 11:
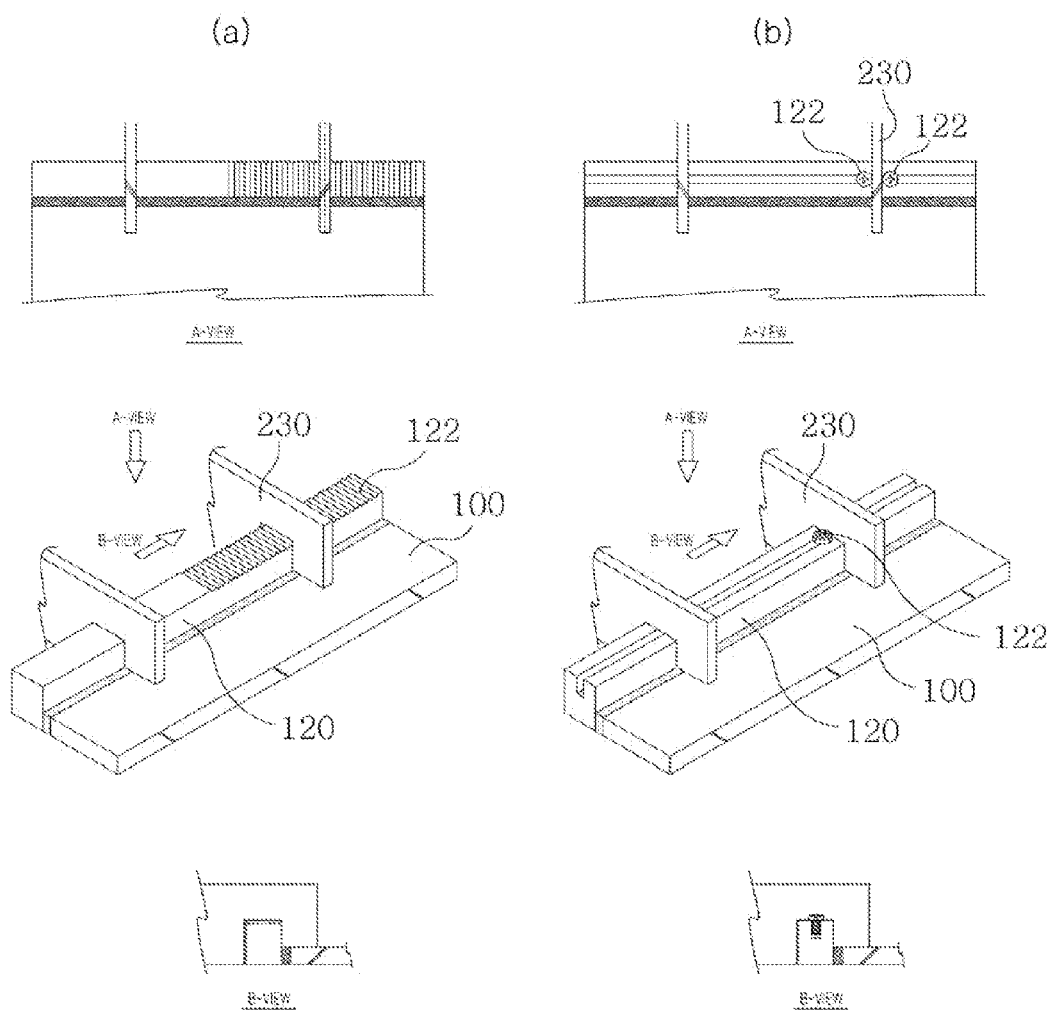
Figure 12:
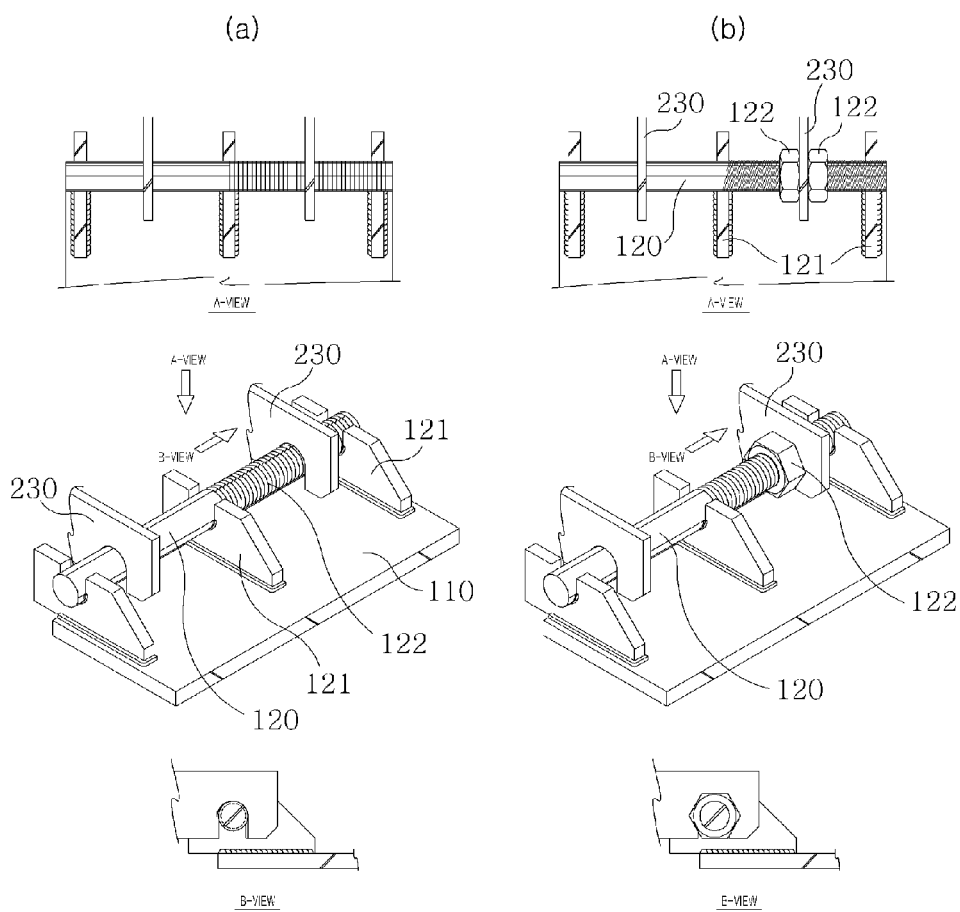
Figure 13:
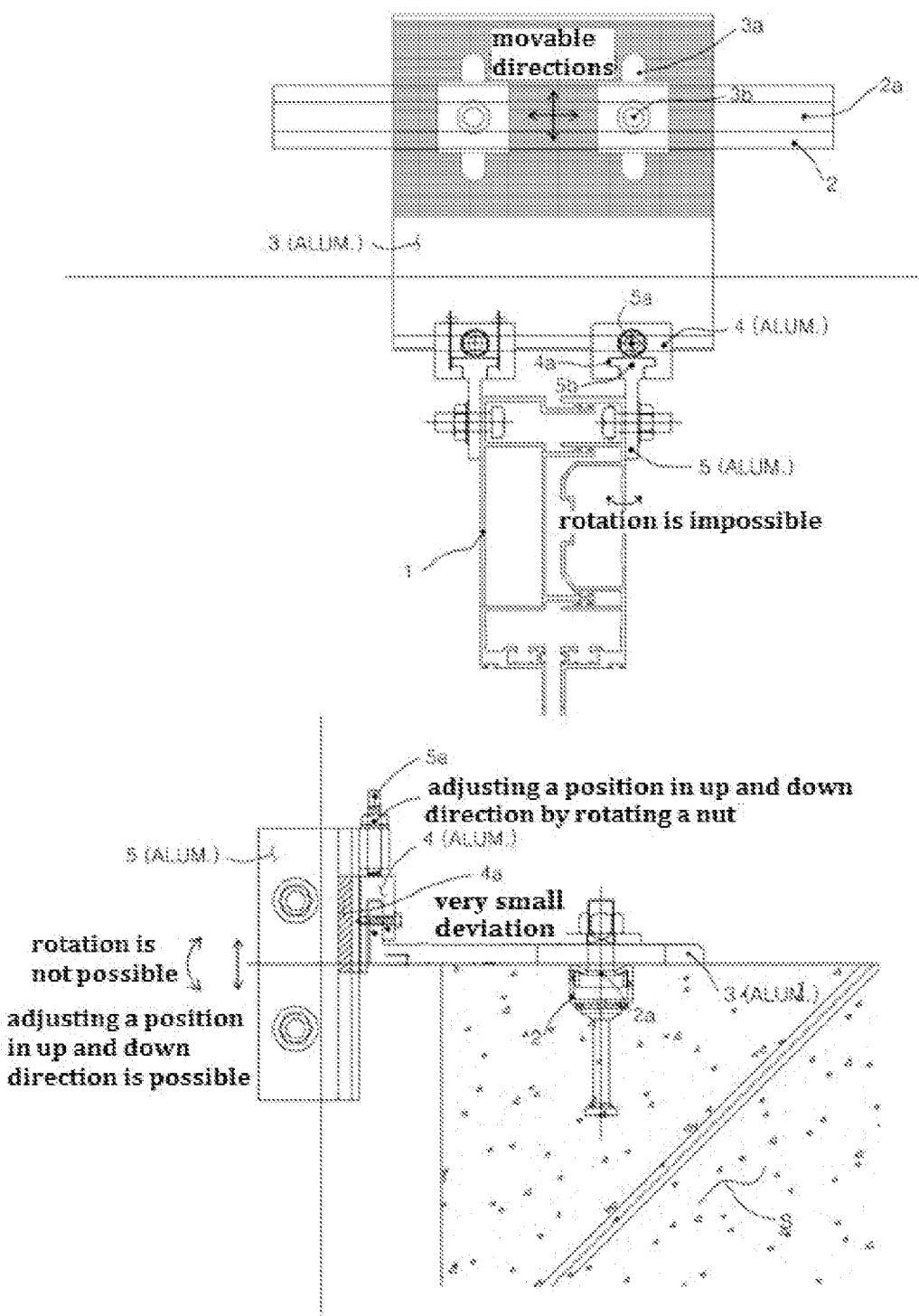
Figure 14:
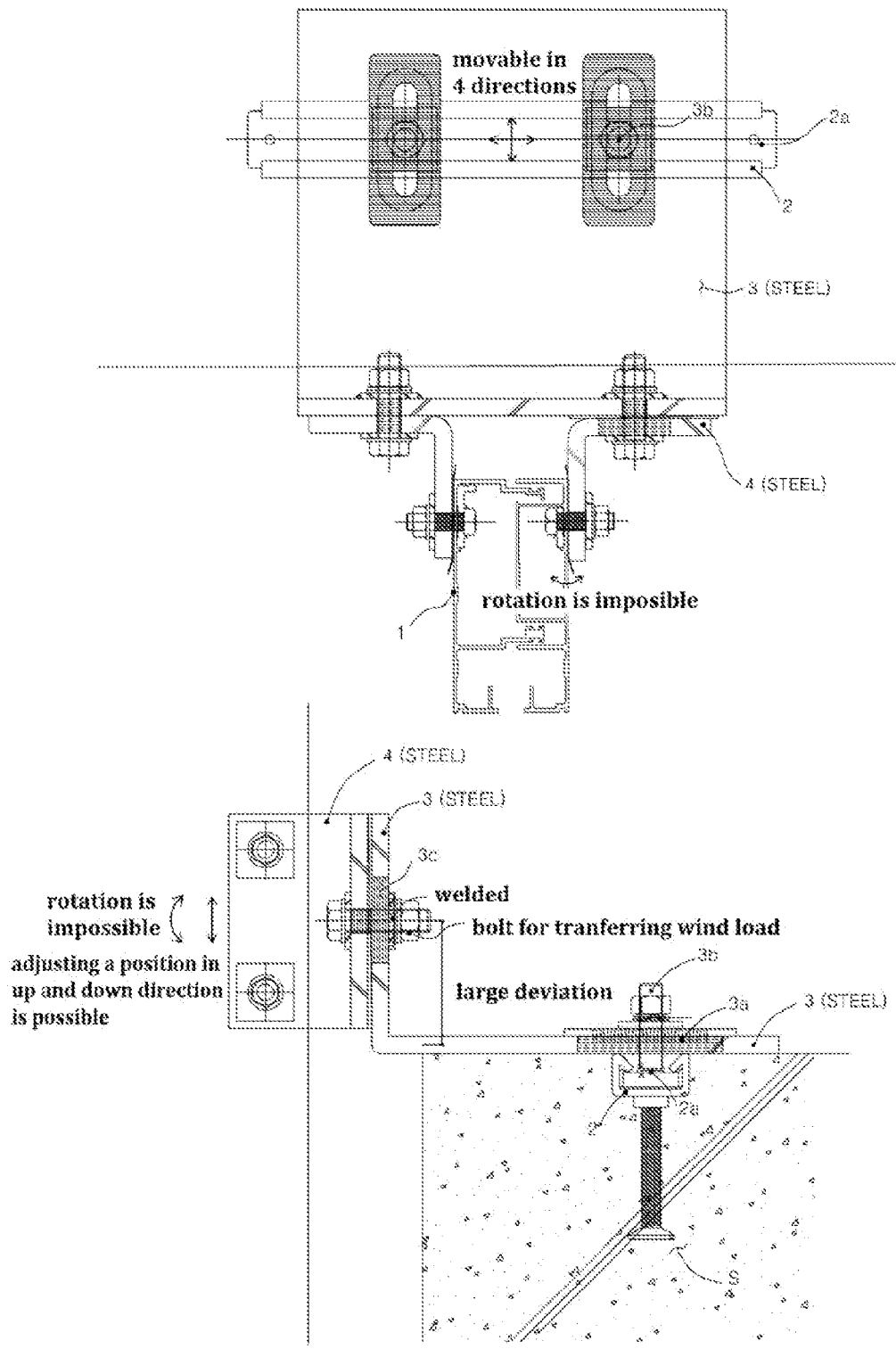

FIG. 10 is an exemplary perspective view of a fixing portion 210, a portion (a) of FIG. 10 illustrates various shapes of a fixing portion 210 according to the third embodiment, and a portion (b) of FIG. 10 illustrates various shapes of a fixing portion 210 according to the fourth embodiment;

FIG. 11 is an exemplary diagram, illustrates a state when a left-and-right movement of one of two catching portion 230 supporting a vertical member 10 is limited by a stopper 122 formed in a support portion 120, a concave and convex portion 112 disposed in a top surface of the support portion 120 at certain intervals acts as the stopper 122 in a portion (a) of FIG. 11, a bolt coupled to the support portion 120 to contact both side surface of the catching portion 230 acts as the stopper 122 in a portion (b) of FIG. 11, and a pin inserted into the support portion 120 to contact both side surface of the catching portion 230 acts as the stopper 122;

FIG. 12 is another exemplary diagram, illustrates a state when a left-and-right movement of one of two catching portion 230 supporting a vertical member 10 is limited by a stopper 122 formed in a support portion 120, a concave and convex portion 112 formed along an outer surface of the support portion 120 at certain intervals acts as the stopper 122 in a portion (a) of FIG. 12, a nut coupled to a screw thread formed in an outer surface of the support portion 120 to contact both side surface of the catching portion 230 acts as the stopper 122 in a portion (b) of FIG. 12, and a pin inserted into the support portion 120 to contact both side surface of the catching portion 230 acts as the stopper 122;

FIG. 13 is an exemplary diagram illustrating a problem according to a related art; and FIG. 14 is an exemplary diagram illustrating a problem according to another related art.

Reference will now be made in detail to the exemplary embodiments of the present invention, examples of which are illustrated in the accompanying drawings. Wherever possible, the same reference numbers will be used throughout the drawings to refer to the same or like parts. Hereinafter, embodiments of the present invention will be described in detail with reference to the accompanying drawings.

THE FIRST EMBODIMENT

Figure 1:
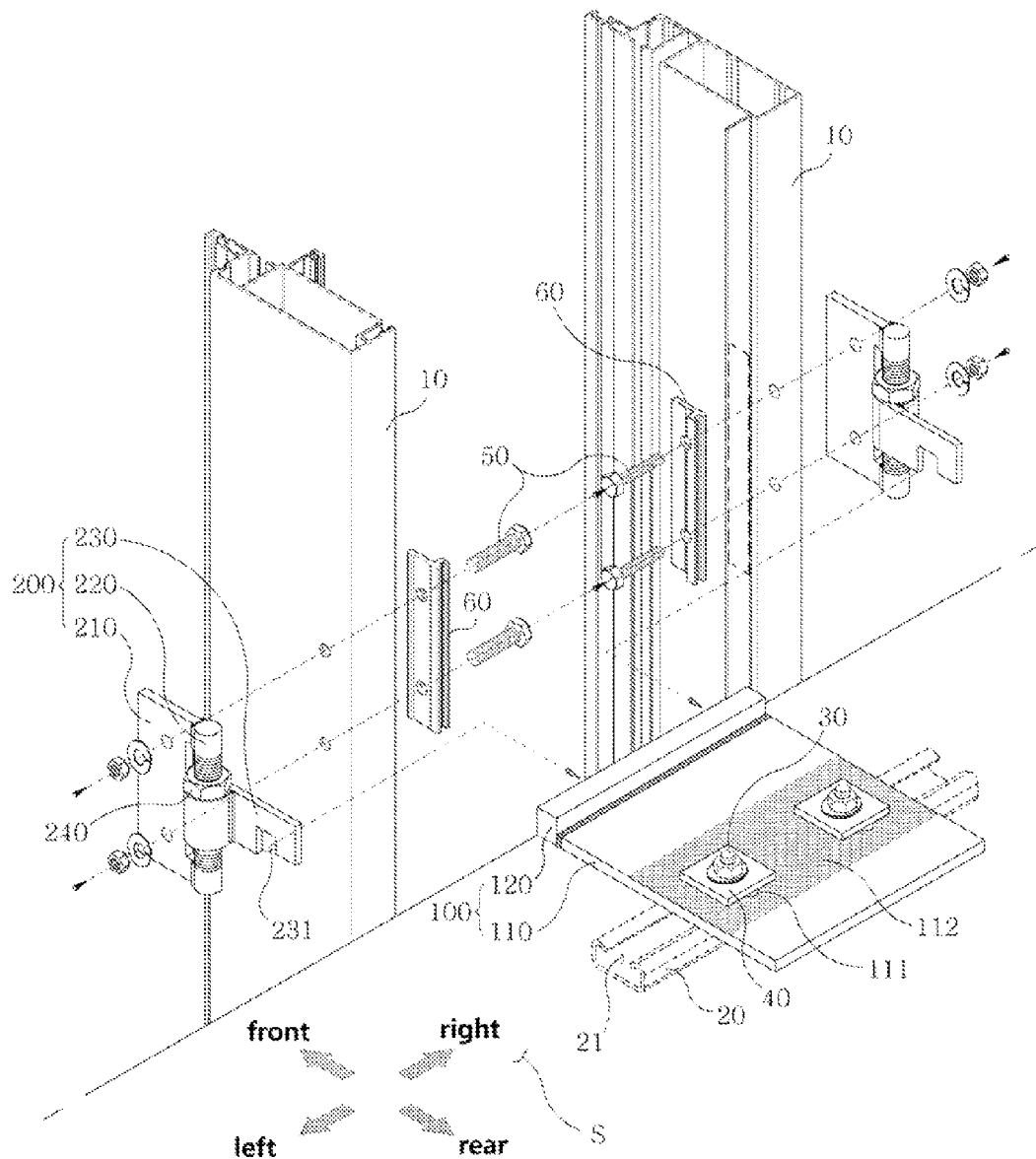
FIG. 1 is an exploded perspective view according to a first embodiment of a present invention.
Figure 2:
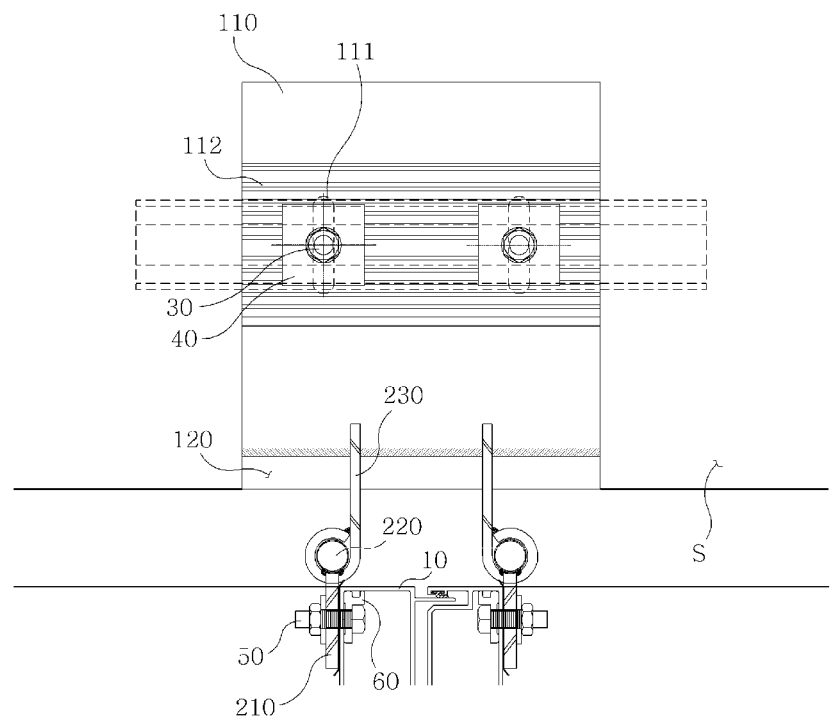
FIG. 2 is an exemplary diagram illustrating a plane structure according to the first embodiment of the present invention.
Figure 3:
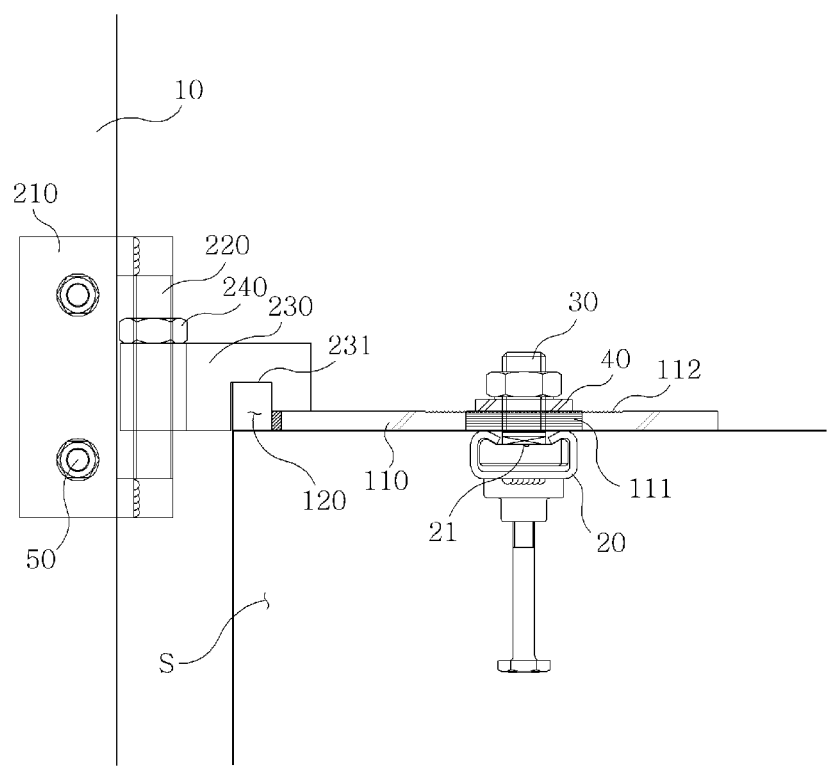
FIG. 3 is an exemplary diagram illustrating a side structure according to the first embodiment of the present invention.

FIG. 1 is an exploded perspective view according to the first embodiment of the present invention, FIG. 2 is an exemplary diagram illustrating a plane structure according to the first embodiment of the present invention, and FIG. 3 is an exemplary diagram illustrating a side structure according to the first embodiment of the present invention.

As shown in FIG. 1, the first embodiment includes a first bracket 100 fixed to an end portion of a slab (S), and a second bracket 200, one side of which is coupled to a vertical member 10 of a curtain wall unit, and the other side of which is coupled to the first bracket 100, so as to transfer the load of the curtain wall unit to the slab (S).

The first bracket 100 is fixed to the end portion of the slab (S), and includes a planar base portion 110 fixed to the end portion of the slab (S), and a support portion 120 formed on the front of the end portion of the base portion 110 so as to be higher than the top surface of the base portion 110.

As shown in FIG. 1 or 2, the base portion 110 has a tetragonal planar shape, but a shape of the base portion 110 is not limited to the shape shown in FIG. 1 or 2, and therefore, the shape of the base portion 110 may be modified into various shapes depending on a shape of the end portion of the slab (S) or a surrounding condition. An anchoring long hole 111 lengthily extending to the end portion of the slab (S) is formed in the base portion 110, and the number, size and arrangement interval of the anchoring long hole 111 is determined depending on a load acting on the base portion 110.

The support portion 120 is formed on the front of an end portion of the base portion 110 so as to be higher than the top surface of the base portion 110.

In the first embodiment, the support portion 120 has a rectangular cross-section and a stick shape, and protrudes from the top surface of the base portion 110 in order for a step height to be formed between the top surface of the base portion 110 and a top surface of the support portion 120. The support portion 120 may be joined to the base portion 110 on the front of an end portion of the base portion 110 by using the welding, the bolting or the like, or may be integrally manufactured with the base portion 110 by milling a member.

To join the first bracket 100 on the end portion of the slab (S), as shown in FIG. 1 or 3, an anchor bar 20 in which a C-type groove 21 is formed has to be buries in the edge of the slab (S) to be mounted therein.

An anchor bolt 30 is inserted into the C-type groove 21 of the anchor bar 20, and a screw-thread portion of the anchor bolt 30 is penetrated through the anchoring long groove 111 formed in the base portion 110 to be connected to a tetragonal washer 40 and a nut to be fixed.

A concave and convex portion, which corresponds to a concave and convex portion 112 formed in a peripheral portion of the anchoring long hole 111, is formed in a bottom surface of the tetragonal washer 40, and thus, if a position of the first bracket 100 is finally settled and the nut is fastened, a sliding in a front-and-rear direction is prevented, and thus, the anchor bolt 30 may be stably fixed.

The second bracket 200 includes a fixing portion 210, a height-adjusting bolt 220, a catching portion 230 and a height-adjusting nut 240.

The fixing portion 210 is joined to a vertical member 10 of the curtain wall unit by using the welding, the bolting or the like, and generally manufactured in a planar shape, but a shape of the fixing portion 210 is not limited into the shape, and therefore, if the fixing portion 210 may be coupled to the vertical member 10 and may include the height-adjusting bolt 220 formed in one end portion of a cross sectional portion, the shape of the fixing portion 210 may be modified into various shapes. A detailed shape of the fixing portion 210 is not limited into the shape shown in FIGS. 1 to 3 or FIG. 5, and therefore, the shape of the fixing portion 210 may be modified into various shapes depending on a shape of the vertical member 10 or a surrounding condition.

A height-adjusting bolt 220 is coupled and fixed vertically at one side end portion of the fixing portion 210, the one side end portion facing the direction of the first bracket 100. That is, an upper portion and lower portion of the height-adjusting bolt 220 are respectively fixed by using the welding, the bolting or the like at portions which horizontally protrude from the upper and lower portion of one side end portion of the fixing portion 210 to the first bracket 100.

Figure 5:
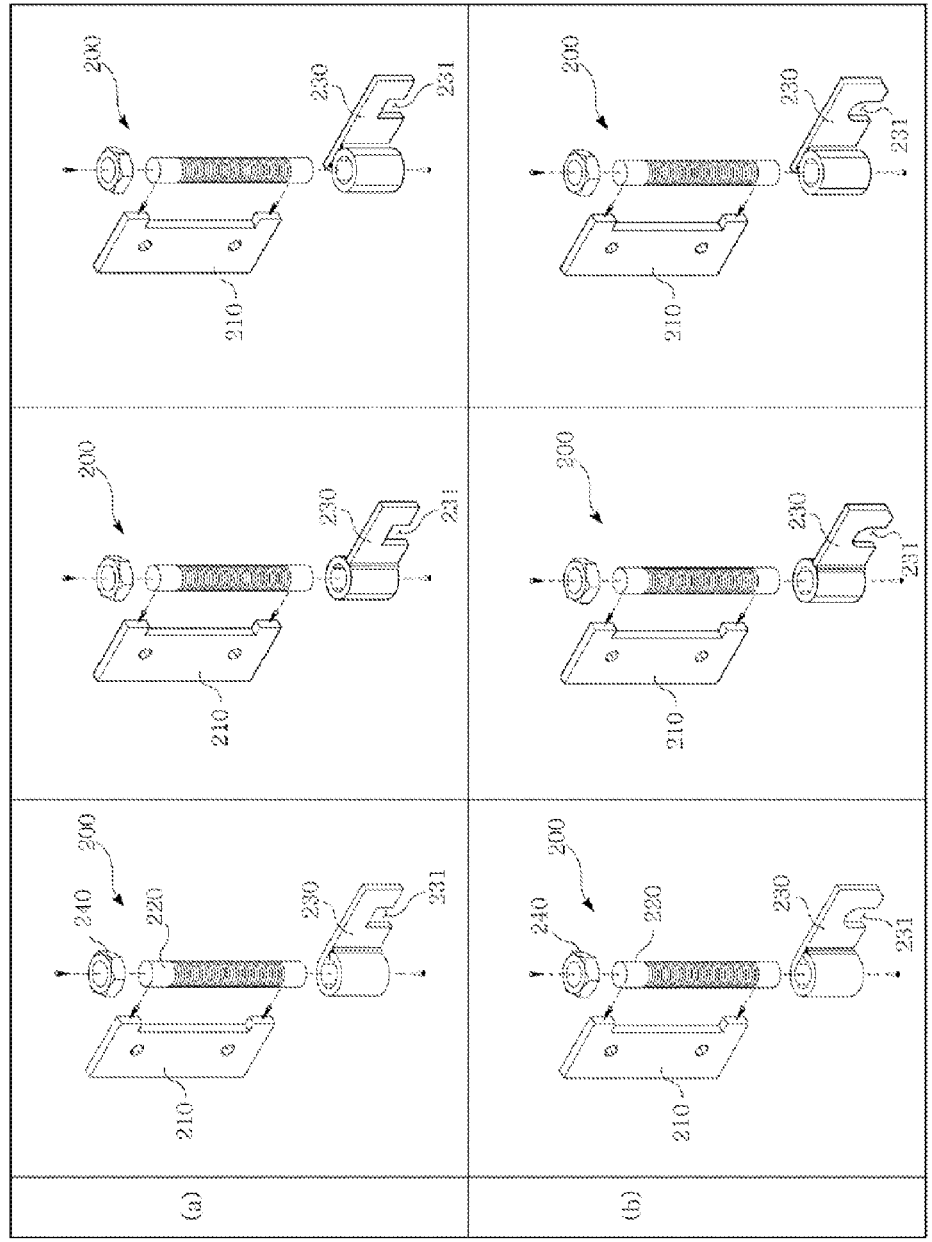
FIG. 5 is an exemplary perspective view of a catching portion, a portion (a) of FIG. 5 illustrates various shapes of a catching portion 230 according to the first embodiment, and a portion (b) of FIG. 5 illustrates various shapes of a catching portion 230 according to the second embodiment.

As shown in FIG. 3 and a portion (a) of FIG. 5, the catching portion 230 is coupled so as to be horizontally rotatable and vertically slidable on the height-adjusting bolt 220. That is, one side of the catching portion 230 is not coupled by a scheme of securing a screw, but the height-adjusting bolt 220 is simply inserted into the fixing portion 210, and thus, the catching portion 230 is coupled so as to be horizontally rotatable and vertically slidable on the height-adjusting bolt 220.

The other side of the catching portion 230 is mounted on the support portion 120. For this end, a support-portion accommodation groove 231 having a shape corresponding to the shape of the cross section of the support portion 120 is formed in a lower portion of the other side of the catching portion 230 so as to accommodate the support portion 120, and thus, the other side of the catching portion 230 is mounted on the support portion 120 in a type as shown in FIG. 3.

In case of need, an edge portion of the catching portion 230 may be cut in order for an interference between the catching portion 230 and the supporting portion 120 or the base portion 110 not to be occurred, thereby an installation in a site being convenient.

As shown in FIG. 3 and in a portion (a) of FIG. 5, the height-adjusting nut 240 is coupled to the height-adjusting bolt 220 to press one side of the catching portion 230. That is, the support-portion accommodation groove 231, which is formed in a lower portion of the other side of the catching portion 230 coupled to the vertical member 10 of the curtain wall unit, is placed on the support portion 120, and then, one side of the catching portion 230 is pressed by rotating the height-adjusting nut 240, thereby the support portion 120 being accommodated on the support-portion accommodation groove 231 formed in a lower portion of the other side of the catching portion 230 to be in close contact with and fixed to the support-portion accommodation groove 231.

The curtain wall unit includes the vertical member 10 and a horizontal member. The vertical member 10 and the horizontal member are assembled together to form a frame of a lattice type, and a panel member such as aluminum panel or a glass panel is attached on a front surface of the frame. As shown in the accompanying drawings, the vertical member 10 may be formed by assembling a pair of a left member and a right member, or although not shown, the vertical member 10 may be comprised of one body to be used.

When the vertical member 10 is formed by assembling a pair of a left member and a right member, as shown in FIG. 1 or FIG. 2, a reinforce member 60 may be included inside the vertical member 10 so as to connect the fixing portion 210 to a fixing bolt 50.

A construction process according to the first embodiment will be provided below.

(1) An adjustment of a position in a left-and-right direction for the first bracket 100 is approximately performed, the first bracket 100 is temporarily fixed by the anchor bolt 30 inserted into the anchor bar 20, and then, the curtain wall unit to which the second bracket 200 is coupled is raised to the installation positions.

(2) The support-portion accommodation groove 231 formed in the catching portion 230 of the second bracket 200 connected to the curtain wall unit is fastened to the support 120 of the first bracket 100.

(3) A position for the curtain wall unit is finally determined. That is, a left-and-right position is adjusted by moving the anchor bolt 30 placed in the C-type groove 21 of the anchor bar 20 and the first bracket 100, along the C-type groove 21 in a left-and-right direction, a front-and-rear position is adjusted by moving the first bracket 100 in a front-and-rear direction about the anchor bolt 30, which is inserted into the C-type groove 21 formed in the anchor bar 20 and inserted into the anchoring long hole 111 formed in the first bracket 100, an up-and-down position is adjusted by rotating the height-adjusting nut 240 coupled to the height-adjusting bolt 220 connected to the fixing portion 210, and then the final position is determined. Particularly, one end of the catching portion 230 is rotatably connected to the height-adjusting bolt 220 connected to the fixing portion 210, thereby enabling a rotation of the curtain wall unit in a horizontal direction to be performed. Therefore, the curtain wall unit may be easily mounted on the end portion of the slab (S) having a curve-shaped face.

(4) If the final position of the curtain wall unit is determined, the anchor bolt 30 is completely coupled in order for the concave and convex portion 112 of the base portion 110 to be in close contact with the concave and convex portion 112 of the tetragonal washer 40 to be fixed to each other.

THE SECOND EMBODIMENT

Figure 4:
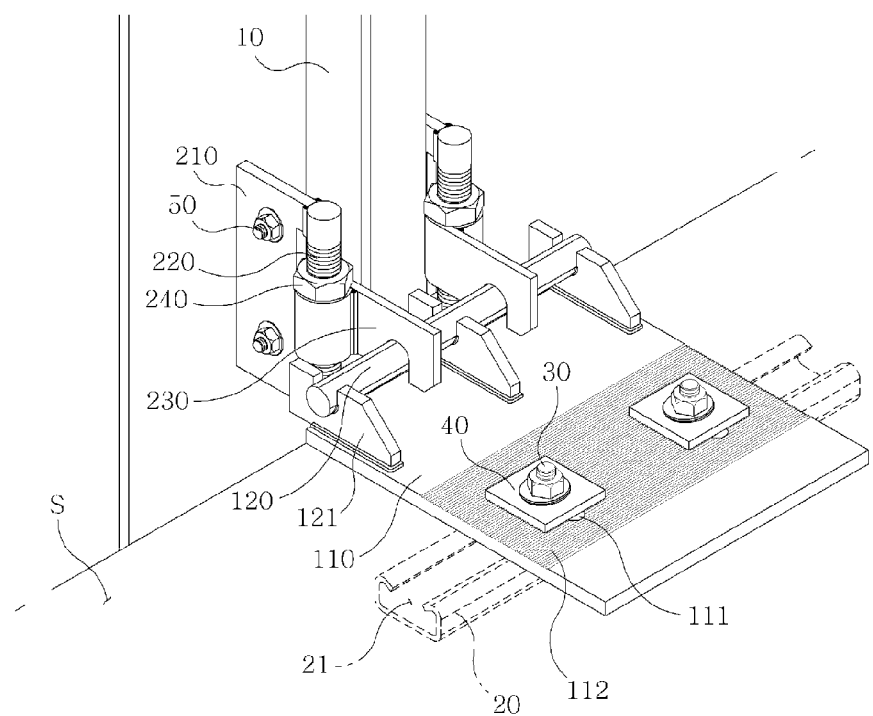
FIG. 4 is an exemplary perspective view illustrating a configuration of a second embodiment of the present invention, an assembly of which is completed.

Except the shape of the support-portion accommodation groove 231 formed in the lower portion of the other side of the catching portion 230 and the shape of the support portion 120, the second embodiment, as shown in FIG. 4, has the same structure as that of the first embodiment. In the second embodiment, a support portion 120 of the first bracket 100 has a circular cross-section and is formed in a bar shape, and is separated from the top surface of the base portion 110 by a placing member 121 to be installed.

Furthermore, the support-portion accommodation groove 231, as shown in a portion (b) of FIG. 5, has a ¾ arc section. As describe above, because the support-portion accommodation groove 231 having an arc section is placed in the support portion 120 of a circular-bar shape, even though the catching portion 230 is being sloped at a certain angle to be placed, the catching portion 230 may be stably coupled to the support portion 120. Therefore, the vertical member 10 of the curtain wall unit which is not formed in a straight-line shape but in a curve shape may be easily applied.

THE THIRD EMBODIMENT

Figure 6:
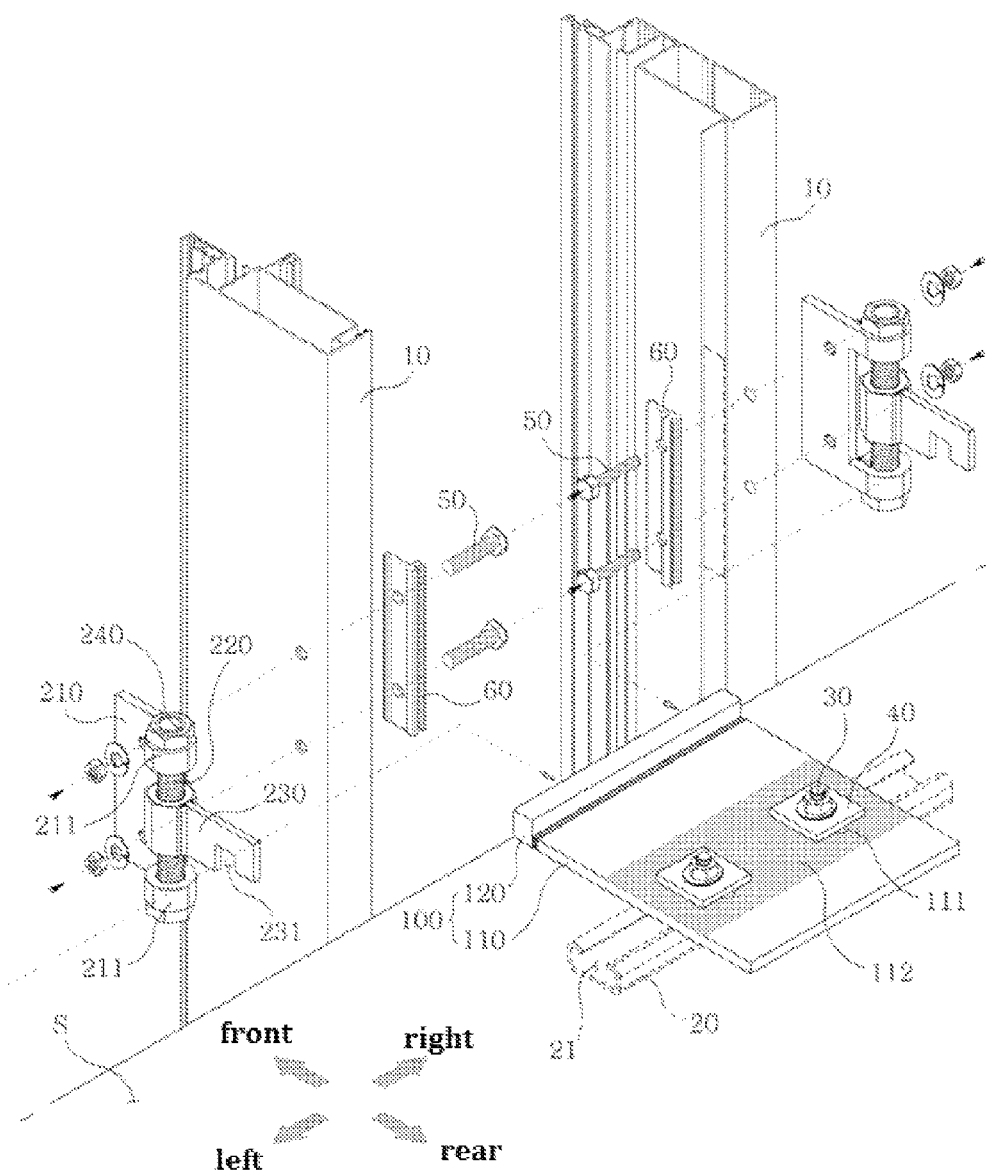
FIG. 6 is an exploded perspective view according to a third embodiment of a present invention.
Figure 7:
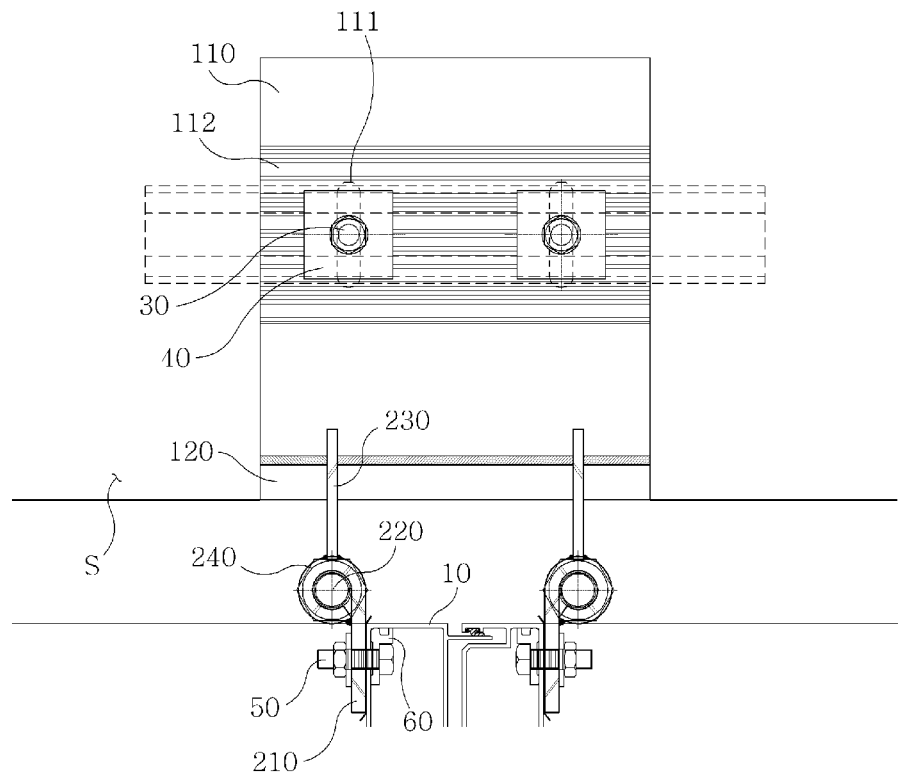
FIG. 7 is an exemplary diagram illustrating a plane structure according to the third embodiment of the present invention.
Figure 8:
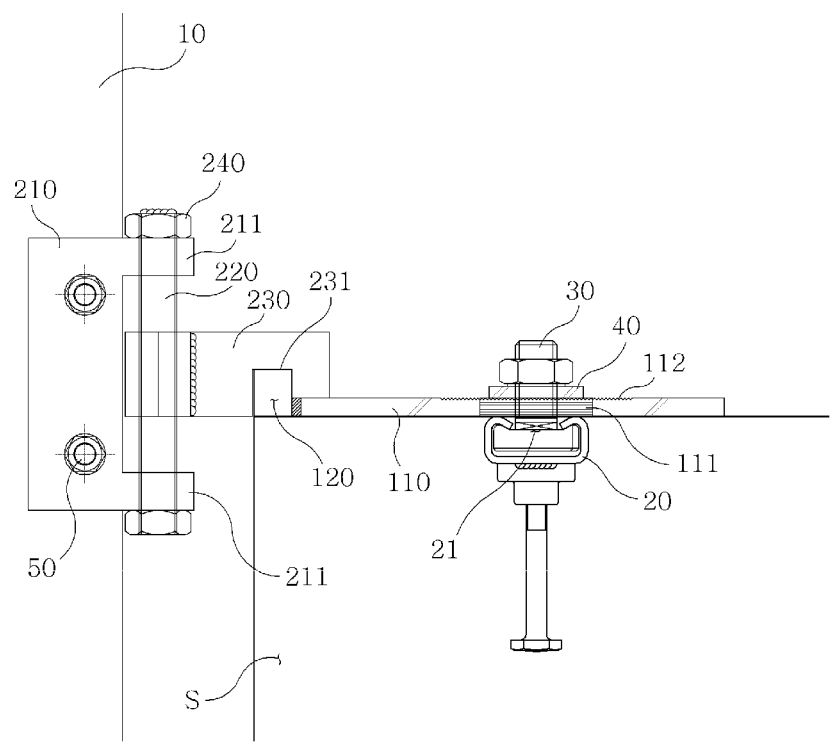
FIG. 8 is an exemplary diagram illustrating a side structure according to the third embodiment of the present invention.

Except any portion of the structure of the second bracket 200, the third embodiment, as shown in FIGS. 6 to 8, has the same structure as that of the first embodiment, and thus, the structure of the first bracket 100 is the same.

The second bracket 200 according to the third embodiment includes a fixing portion 210, a height-adjusting bolt 220, a catching portion 230 and a height-adjusting nut 240.

The fixing portion 210 is joined to a vertical member 10 of the curtain wall unit by using the welding, the bolting or the like. A detailed shape of the fixing portion 210 is not limited into the shape shown in FIGS. 6 to 8 or a portion (a) of FIG. 10, and therefore, the shape of the fixing portion 210 may be modified into various shapes depending on a shape of the vertical member 10 or a surrounding condition.

The height-adjusting bolt 220 has a shape similar to a shape of a general bolt, and is fixed vertically along one side end of the fixing portion 210, the one side end facing the direction of the first bracket 100, and thus, the height-adjusting bolt 220 is horizontally rotatable. That is, as shown in a portion (a) of FIG. 10, bolt-support portions 211, through which the height-adjusting bolt 220 passes, are respectively formed in a upper portion and a lower portion of one side end portion of the fixing portion 210, and the height-adjusting bolt 220 is coupled to the bolt-support portion 211 so as to be horizontally rotatable.

That is to say, the height-adjusting bolt 220 is not coupled to the bolt-support portion 211 by a scheme of securing a screw, but only passes through the bolt-support portion 211.

One side of the catching portion 230 is coupled to the height-adjusting bolt 220 by driving the height-adjusting bolt 220, and the height-adjusting nut 240 is fixed to an upper portion of the height-adjusting bolt 220, which passes through the bolt-support portion 211, to integrally rotate with the height-adjusting bolt 220 to adjust a height of the catching portion 230, and also, the height-adjusting nut 240 is placed in an upper portion of the bolt-support portion 211 to prevent the height-adjusting bolt 220 from being separated.

If needed, a head portion of the height-adjusting bolt 220 may be located in an upper side and the height-adjusting nut 240 may be located in a lower side. In this case, the head portion of the height-adjusting bolt 220 may perform the above-described function on behalf of the height-adjusting nut 240.

The other side of the catching portion 230 is placed in an upper side of the support portion 120. Also, the support portion 120 of the first bracket 100 has a rectangular cross-section and a stick shape, and a step height is formed between the support portion 120 of the first bracket and a top surface of the base portion 110, like the first embodiment.

A support-portion accommodation groove 231 having a shape corresponding to the shape of the cross section of the support portion 120 is formed in a lower portion of the other side of the catching portion 230 so as to accommodate the support portion 120.

When the support portion 120 is being accommodated by the support-portion groove 231, if the height-adjusting nut 240 is rotated, the height-adjusting bolt 220 is rotated in connection with the height-adjusting nut 240. Because one side of the catching portion 230 is coupled to the height-adjusting bolt 220 by driving the height-adjusting bolt 220, a height of the catching portion 230 is adjusted by rotating the height-adjusting bolt 220. The reason is because a lower portion of the other side of the catching portion 230 is coupled to the support portion 120 to prevent the catching portion 230 from being rotated.

Therefore, if the height-adjusting nut 240 is rotated in order for the catching portion 230 to descend, a joint force between the catching portion 230 and the support portion 120 is strengthened, thereby enabling the curtain wall unit to be strongly fixed to the slab (S).

Moreover, because an adjusting of an angle in the left-and-right direction is possible when the catching portion 230 is being coupled to the height-adjusting bolt 220 by driving the height-adjusting bolt 220, and thus, the curtain wall unit may be easily mounted on the end portion of the slab (S) having a curve-shaped face.

THE FOURTH EMBODIMENT

Figure 9:
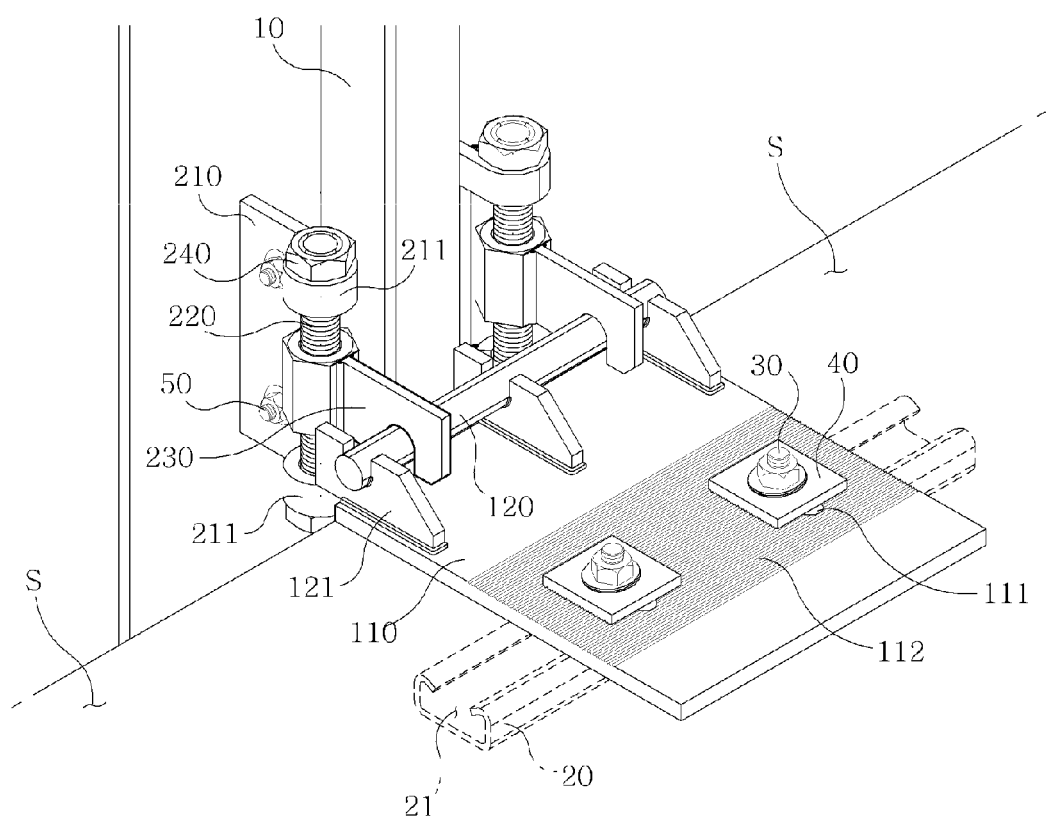
FIG. 9 is an exemplary perspective view illustrating a configuration of a fourth embodiment of the present invention, an assembly of which is completed.

Except the shape of the support-portion accommodation groove 231 formed in the lower portion of the other side of the catching portion 230 and the shape of the support portion 120, the fourth embodiment, as shown in FIG. 9, has the same structure as that of the third embodiment.

In the fourth embodiment, a support portion 120 of the first bracket 100 has a circular cross-section and is formed in a bar shape, and is separated from the top surface of the base portion 110 by a placing member 121 to be installed. As describe above, because the support-portion accommodation groove 231 having an arc section is placed in the support portion 120 of a circular-bar shape, even though the catching portion 230 is being sloped at a certain angle to be placed, the catching portion 230 may be stably coupled to the support portion 120. Therefore, the vertical member 10 of the curtain wall unit which is not formed in a straight-line shape but in a curve shape may be easily applied.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

First, according to the embodiments of the present invention, the new concept fastener, which enables a left-and-right rotation and an up-and-down rotation as well as an adjustment of a position in a front, rear, left and right direction to be performed, is provided, and thus be widely used in a curtain wall unit of a variety of curve forms.

That is to say, an adjustment of a position in a front-and-rear direction is conducted by adjusting a fixing position of the first bracket 100 with the anchoring long hole 111, an adjustment of a position in a left-and-right direction is conducted by adjusting a position of the first bracket 100 which is coupled to the anchor bar 20 by the anchor bolt 30 to be fixed in the end portion of the slab (S), an adjustment of a position in an up-and-down direction is conducted by using the height-adjusting bolt 220 and the height-adjusting nut 240, a rotation in a left-and-right direction is conducted by using the catching portion 230 rotatably connected to the fixing portion 210, and also, a rotation in a up-and-down direction is conducted by using the support portion 120 having a circular cross-section and the support-portion accommodation groove 231 corresponding to the support portion 120.

Therefore, the fastener may be easily applied to an end portion of the slab (S) having a curve-shaped face, and easily applied to a curtain wall unit which is bent not in a straight-line shape but in a curve shape.

Second, according to the embodiments of the present invention, the fastener, which enables an easy adjustment of a position in an up-and-down direction to be performed and enables a portion performing the function to be structurally used for a dead load and a wind load, namely, enables a junction part to simultaneously perform two functions, is provide, thereby increasing an economic feasibility.

That is to say, as shown in FIG. 13, in the fastener of the related art, the level bolt 5a for adjusting a height and transferring a dead load, and the sliding groove 4a for transferring a wind load are separated from each other, and thus, it is uneconomical. However, in the fastener according to the present invention, as shown in FIG. 3, the height-adjusting bolt 220 transfers the dead load, which is transferred from the fixing portion 210, to one side of the catching portion 230 via the height-adjusting nut 240, a wind load transferred from the fixing portion 210 is transferred to the one side of the catching portion 230 via the height-adjusting bolt 220 and the height-adjusting nut 240, and the fixing portion 210 is moved in an up-and-down direction by rotating the height-adjusting nut 240 coupled to the height-adjusting bolt 220, and thus, an adjustment of a height of the vertical member 10 of the curtain wall unit is possible. Moreover, in the fastener shown in FIG. 6, by using the height-adjusting bolt 220 and the height-adjusting nut 240, a height of the fixing portion 210 is adjusted, and the dead load and the wind load acting on the fixing portion 210 may be transferred to the catching portion 230.

Third, according to the embodiments of the present invention, the fastener is formed of a steel material so as to perform the adjustment of a position in an up-and-down direction and to transfer the dead load and the wind load, without a sliding groove (a reference numeral '4a' in FIG. 13), and thus, achieves the function and the effect described with reference to the second effect to save the manufacturing cost.

That is to say, in the scheme of the related art curtain wall, as shown in FIG. 13, the fastener, which includes the level bolt 5a for transferring the dead load and adjusting the height, and the sliding groove 4a for transferring the wind load, is needed. Here, it is impossible to manufacture the fastener, which includes the sliding groove 4a, with a steel material, and thus, the fastener is manufactured with an aluminum material. However, the fastener according to the present invention is formed in a simple structure so as to easily adjust a position of the fastener in an up-and-down direction and to transfer the dead load and the wind load, and thus, the fastener may be manufactured with an aluminum material, thereby saving the manufacturing cost.

Fourth, according to the embodiments of the present invention, the fastener minimizes a deviation between connection portions in a stream of the wind load transferred from the curtain wall to the slab, and thus, achieves the highest structural result by using the minimal members, namely, simultaneously achieves a safety and weight-lightening of members, thereby improving workability and saving the material cost. That is to say, as shown in FIGS. 3 and 8, a height between the top surface of the slab (S) and the top surface of a connection portion consisting of the catching portion 230 and the support portion 120 is minimized, and thus, a moment of the wind load transferred to the base portion 110 on the slab (S) may be minimized, thereby members being lightened.

Fifth, according to the embodiments of the present invention, a new concept fastener, which achieves a scheme of coupling a second fastener to the curtain wall unit or the vertical member in a factory in advance, simply placing the second fastener to the first fastener 100, adjusting a position in a front-and-rear direction and a up-and-down direction, and thus, strongly fixing the curtain wall unit to the slab by simply driving a bolt instead of the welding, is provided, thereby simplifying a site process and improving quality.

That is to say, a separate welding process is not needed in a site, every work may be completed by using a simple coupling method and a bolt-fastening method, and thus, quality may be improved, the construction period may be shortened by simplifying a process, a working environment may be improved and a safety accident may be prevented.

Sixth, according to the embodiments of the present invention, the fastener, which lowers a height of the members composing the fastener, is provided, and thus, is easily used in a site with a low floor or in a site without a fan coil box.

That is to say, because the support portion 120 transferring the dead load and the wind load is minimized and a height of the second bracket 200 is lowered by forming the height-adjusting bolt not in an upper portion of the second bracket 200 but in one side of the fixing portion 210, the fastener may be used in a site with a low floor or in a site without a fan coli box.

The invention claimed is:

1. A variable fastener for fixing a curtain wall, enabling a vertical member of a curtain wall unit to be coupled to an end portion of a building slab, the variable fastener comprising:
   a first bracket fixed to the end portion of the slab; and
   a second bracket, one side of which is coupled to the vertical member of the curtain wall unit, and the other side of which is coupled to the first bracket, so as to transfer the load of the curtain wall unit to the slab, wherein,
   the first bracket includes a base portion fixed to the end portion of the slab, and a support portion formed on a front end of the base portion so as to be higher than an upper surface of the base portion, and
   the second bracket includes a fixing portion fixed to the vertical member of the curtain wall unit, a height-adjusting bolt coupled perpendicularly along one side end of the fixing portion, the one side end being in the direction of the first bracket, and horizontally rotatable, a catching portion, one side of which is coupled to the height-adjusting bolt by a scheme of secreting a screw, and the other side of which is mounted on an upper part of the support portion, and a height-adjusting nut fastened to the height-adjusting bolt and integrally rotated with the height-adjusting bolt to adjust the height of the catching portion,
   wherein the support portion of the first bracket has a circular cross-section and a stick shape, and is separated from the upper surface of the base portion by a placing member,
   wherein in the second bracket, bolt-support portions, through which the height-adjusting bolt passes, are respectively formed in an upper portion and a lower portion of one side end portion of the fixing portion, the height-adjusting nut is fixed to an upper portion of the height-adjusting bolt passing through the bolt-support portion and is placed in an upper portion of the bolt-support portion to prevent the height-adjusting bolt from being separated, and a support-portion accommodation groove having a shape corresponding to the shape of the cross section of the support portion is formed in a lower portion of the other side of the catching portion so as to accommodate the support portion.

2. The variable fastener of claim 1, wherein an anchoring long hole lengthily extending to the end portion of the slab is formed in the base portion of the first bracket.

* * * * *